Figure 18:
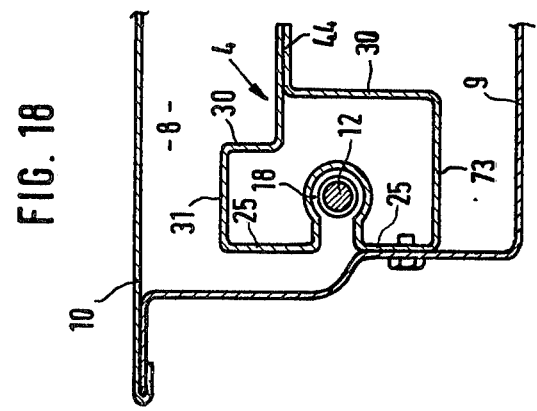

United States Patent [19]

Blankenburg et al.

[11] Patent Number: 4,483,100
[45] Date of Patent: Nov. 20, 1984

[54] PANE GUIDE FOR A SLIDING WINDOW CAPABLE OF BEING LOWERED INTO THE WINDOW SHAFT OF AN AUTOMOBILE

[75] Inventors: Heinz Blankenburg, Bad Homburg; Peter Schäfer, Maintal; Fritz Marr, Offenbach; Harald Köllner, Altenstadt; Rainer Grimm, Wetzlar; Wilhelm Scherf, Rodgau; Horst Böhm, Frankfurt, all of Fed. Rep. of Germany

[73] Assignee: Rockwell-Golde G.m.b.H., Fed. Rep. of Germany

[21] Appl. No.: 445,789

[22] Filed: Dec. 1, 1982

[30] Foreign Application Priority Data

Dec. 11, 1981 [DE] Fed. Rep. of Germany ....... 3149073

[51] Int. Cl.³ ............................................. E05F 11/48
[52] U.S. Cl. ......................................... 49/352; 49/374
[58] Field of Search ................. 49/348, 352, 373, 374, 49/375, 502

[56] References Cited

U.S. PATENT DOCUMENTS 4,237,656 12/1980 Hess et al. ............................. 49/352
4,418,498 12/1983 Wanlass et al. ................... 49/375 X Primary Examiner—Kenneth Downey

[57] ABSTRACT

In a pane guide for a sliding window capable of being lowered into the window shaft (8) of an automobile, the windowpane (1) is laterally guided on windowframe components (4,5), in which back-cut guide channels (18,18') are provided, in which slide elements (23,23') are displaceably guided. The slide elements are connected with the windowpane (1), covering the windowframe components on the outer side of the vehicle, by carrier elements (19 to 22). Due to the mounting of the windowpane outside the windowframe, a projectionless lateral glazing of an automobile is made possible. At the lower end of at least one of the lateral windowframe components (4,5), the guide tube (11, 11') of a cable/tube window winder is connected in alignment with the guide channel (18, 18'). The threaded cable (12, 12') of the window winder extends into the guide channel (18, 18') and is fixed at least to one of the slide elements (19 to 22) situated therein. In this manner a low overall height of the windowshaft is achieved, so that the windowpane and the window shaft can have approximately the same height. With the windowpane (1) is associated a seal (46) disposed on the windowframe (4 to 7), which seal is either continually in sealing contact with the windowpane or, by a movable mounting of the seal or of the windowpane, is arranged so that it can be pressed automatically onto the windowpane (1).

19 Claims, 28 Drawing Figures

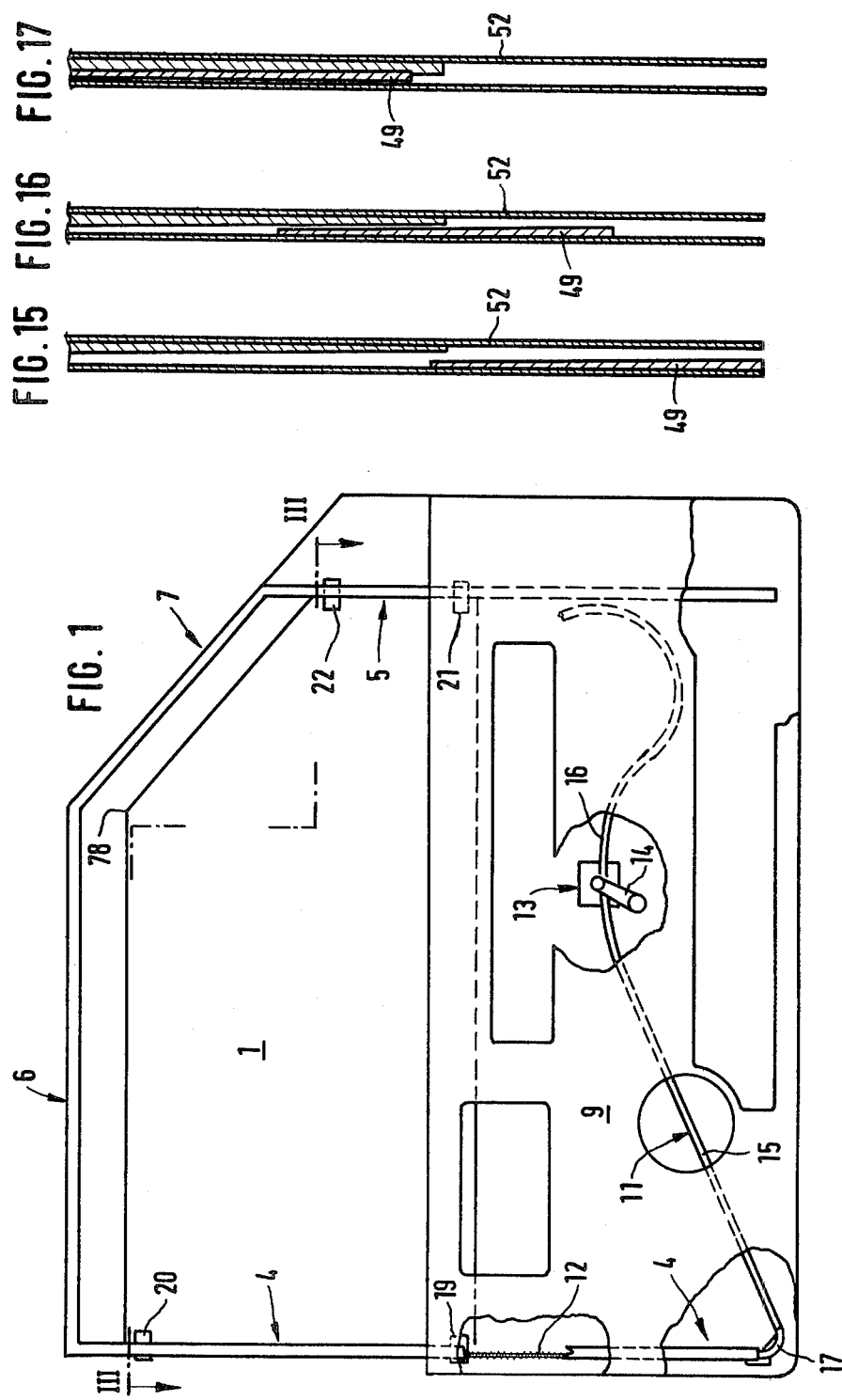

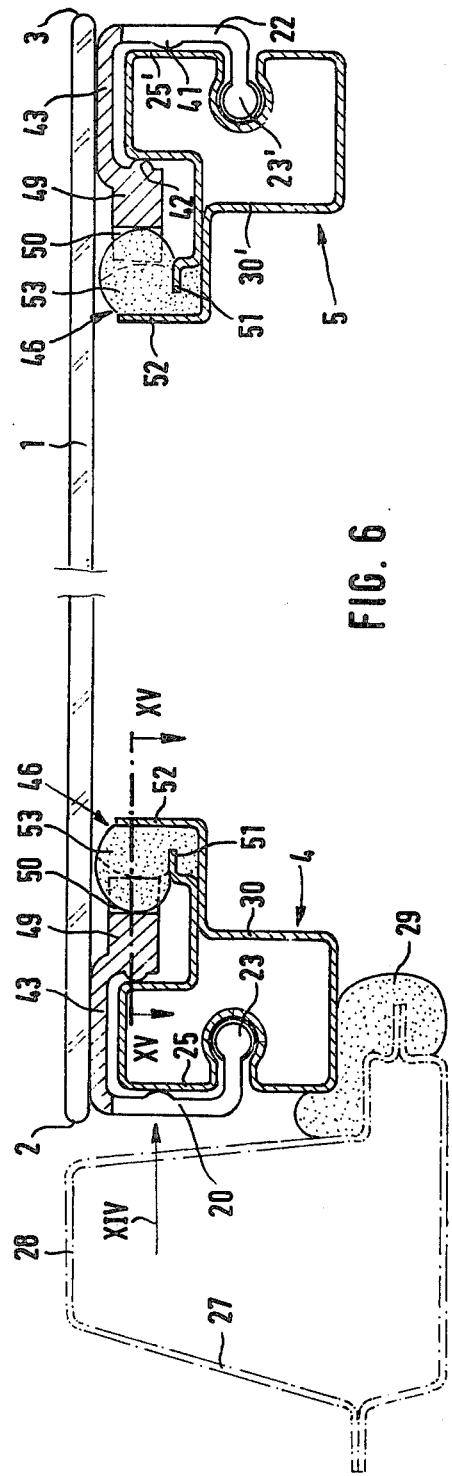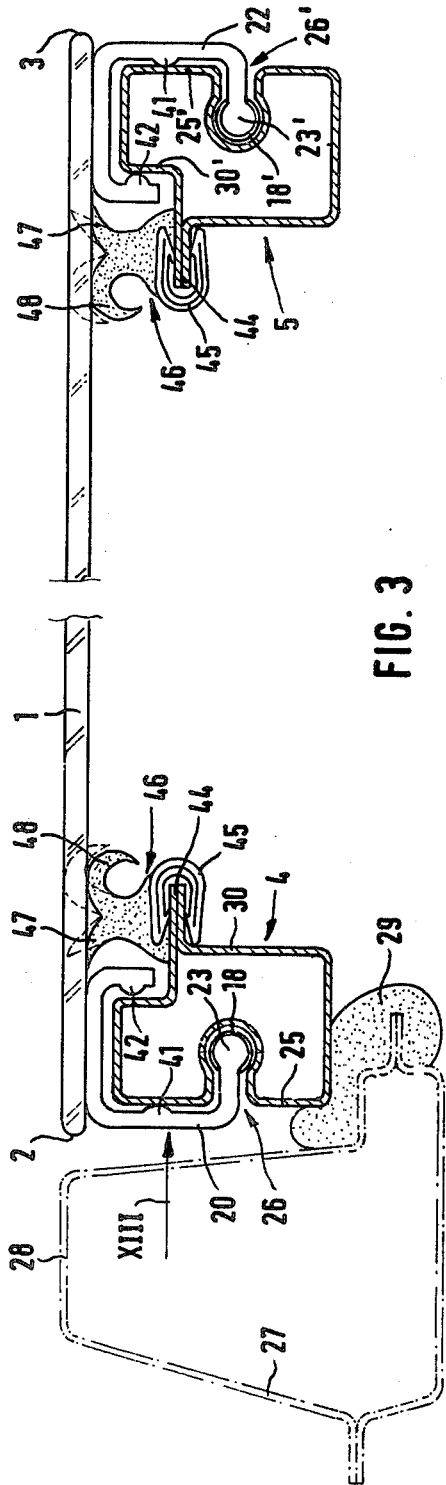
FIG. 6
FIG. 3

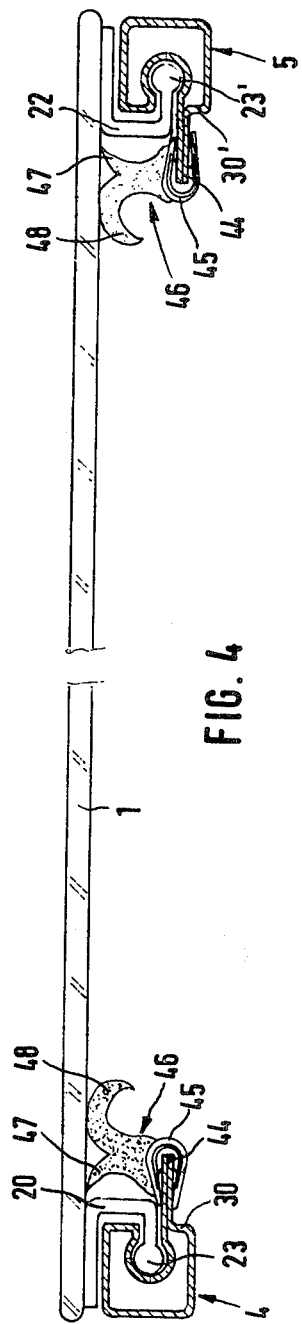
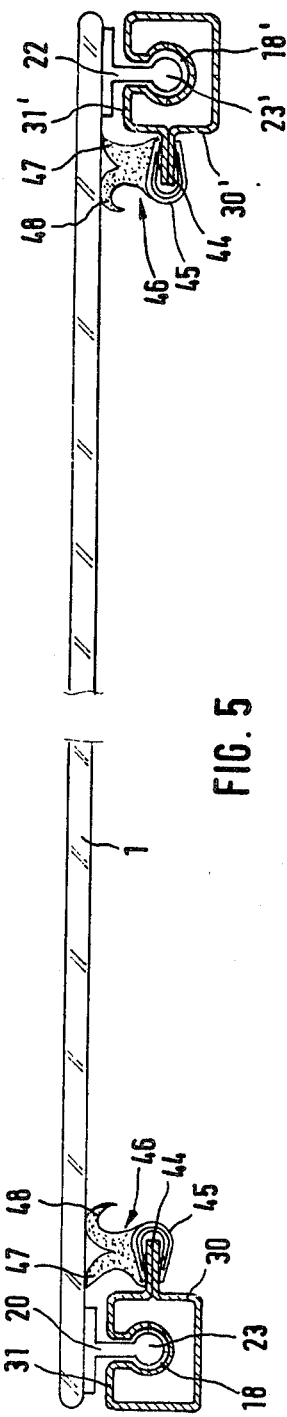
FIG. 4
FIG. 5

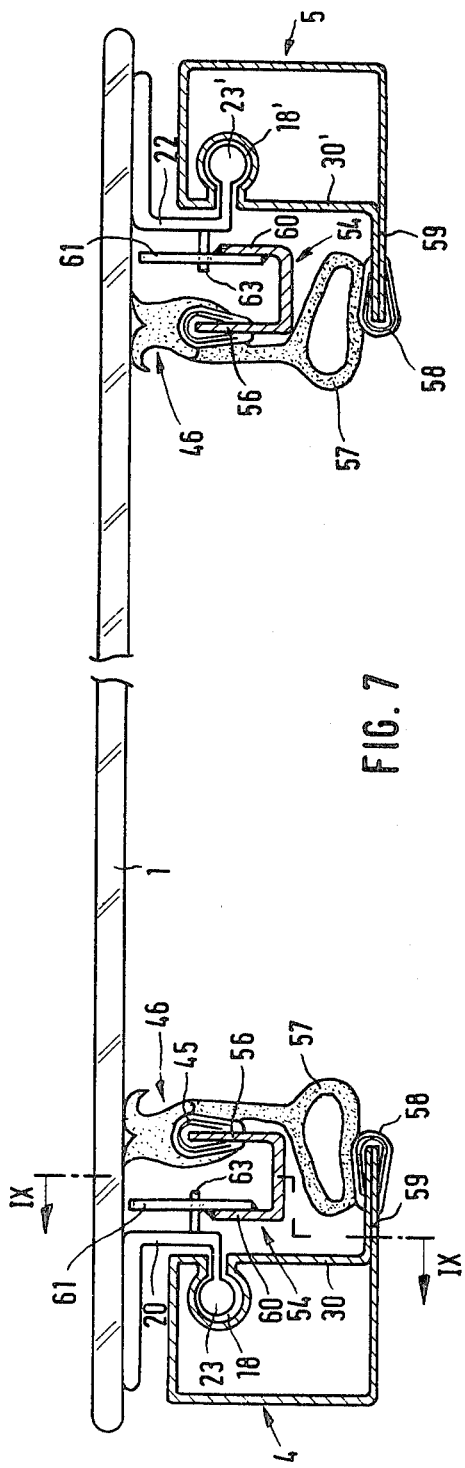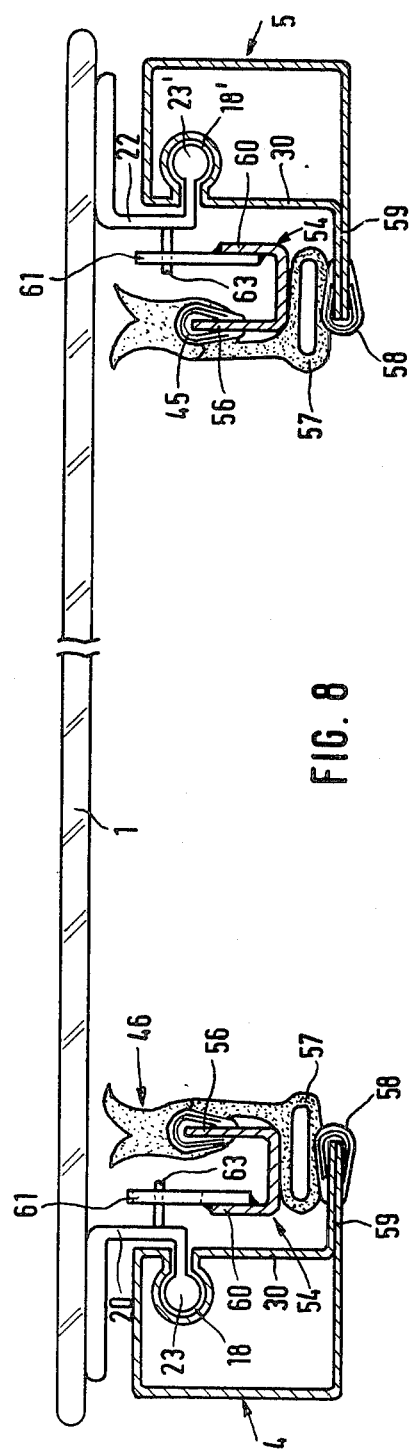
FIG. 7
FIG. 8

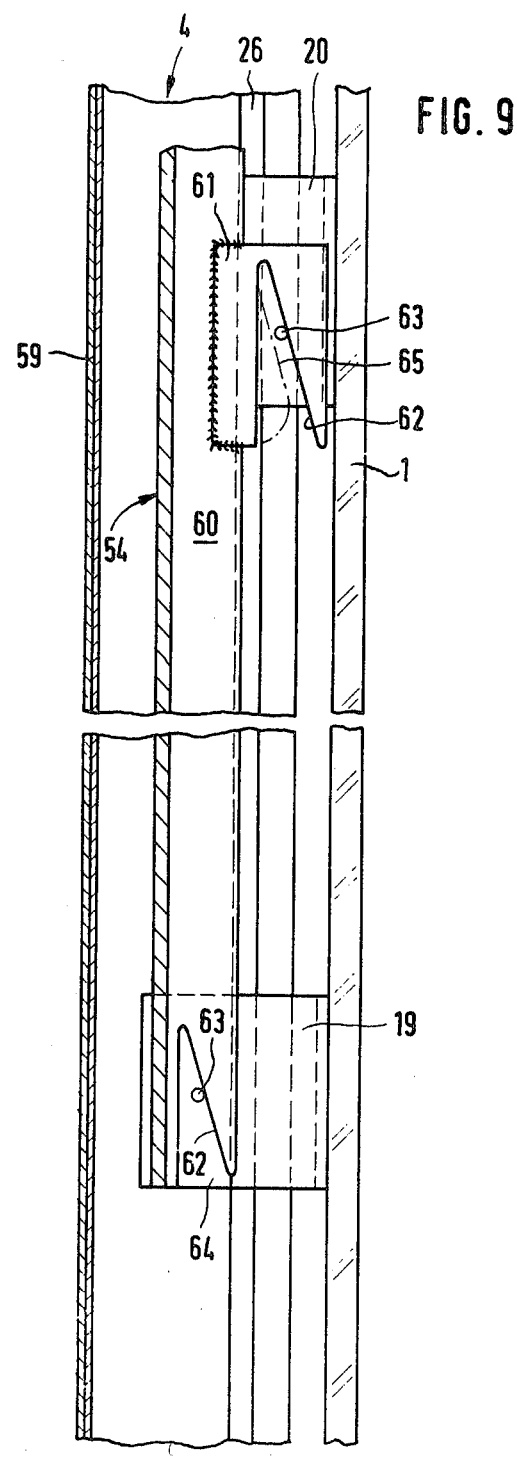

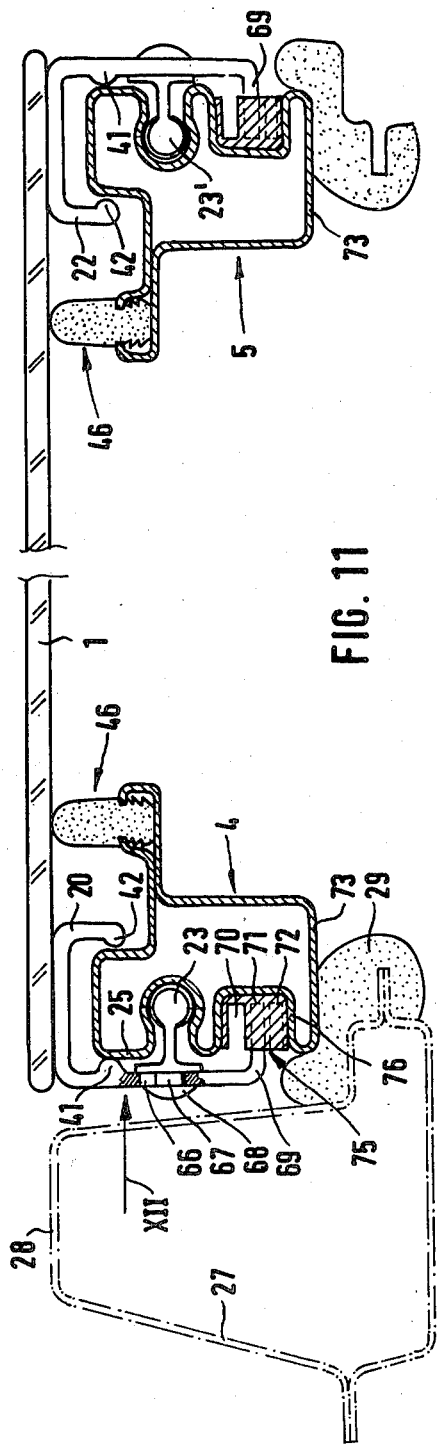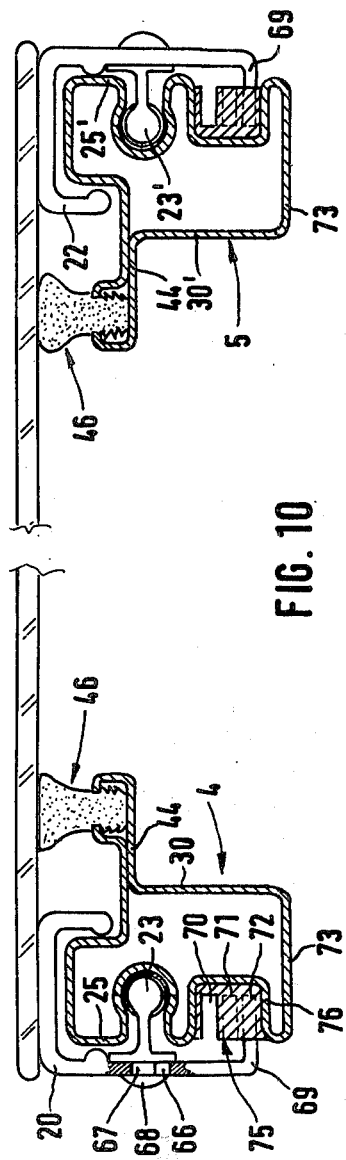
FIG. 11
FIG. 10

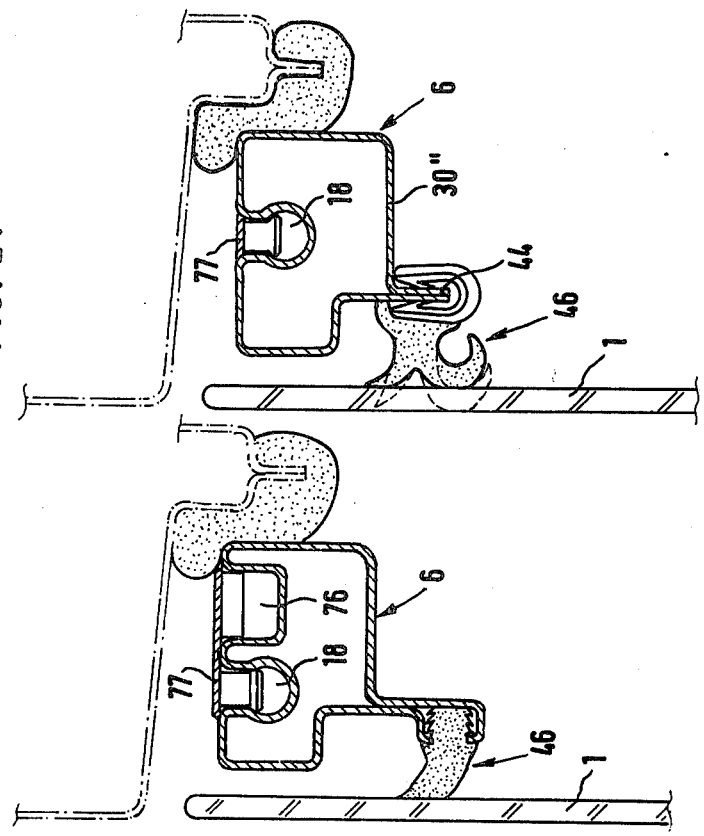

PANE GUIDE FOR A SLIDING WINDOW CAPABLE OF BEING LOWERED INTO THE WINDOW SHAFT OF AN AUTOMOBILE

This invention relates to a pane guide for a sliding window capable of being lowered into the window shaft of an automobile, the windowpane of which is displaceably guided by the two lateral edges on lateral windowframe components extending into the window shaft and is connected with the actuating element of a window winder, which is constructed as a flexible threaded cable guided in tension-transmitting and compression-transmitting manner displaceably in a guide tube, which cable engages with the drive pinion of a stationarily mounted drive apparatus.

Either a pane guide mounted in an automobile door or a pane guide provided in a fixed wall of an automobile body may be considered here. When, therefore, mention is made of a "stationarily" mounted drive apparatus, this may be fixed either to the inner door plate of an automobile door or to a bodywork plate of a fixed vehicle wall.

In edge pane guides of this class, the windowpanes are guided displaceably in U-section guide grooves of the windowframe components. The external surface of the windowpane is consequently recessed back from the external surface of the windowframe, so that in the region of the lateral glazing of an automobile projecting frame edges are present, which increase the wind resistance of the automobile body.

For improving the guidance, especially in windowpanes with inadequate lateral edge guidance, guide rails mounted centrally in the windowshaft have frequently been used, against which guiding slides or trolleys, to which the windowpane is fixed, are arranged to slide or roll. Since on the one hand the slides or trolleys, when the pane is closed, must still remain below the upper edge of the window shaft and on the other hand the windowpane must be capable of complete lowering into the window shaft, the height of the window shaft and thus the so-called girdle height of the automobile body must be so chosen that both the full height of the windowpane and also the height of the slide or trolley can be accommodated in the window shaft. Consequently, the height of the windowpane is necessarily less than that of the window shaft, especially also since the upper part of the windowframe reduces the visible height of the windowpane. For modern automobile bodies, however, a height ratio of windowpane to window shaft of approximately 1:1 is to be aimed at.

The task underlying the present invention is to provide a pane guide with associated window winder, which makes possible a lateral glazing of an automobile free from projections with approximately equal height of windowpane and window shaft.

The stated task is solved, starting from the initially defined category, in that back-cut guide channels extending longitudinally of the frame components are provided at the windowframe components, in which (guide channels) slide elements spaced at intervals apart are guided displaceably, which are connected with carrier elements fixed to the inner surface of the windowpane which covers the windowframe components on the outer face of the automobile, in that the guide tube of the window winder is connected, aligned with the guide channel, to the lower end of at least one of the windowframe components, and that the threaded cable extends into the guide channel and is fixed to at least one of the slide elements situated therein.

In the pane guide of this invention, the windowpane is situated outside the windowframe and is guided thereon by the carrier elements and slide elements. The pane guide consequently provides the possibility, of advantage for low wind resistance, that the outer surface of the pane may adjoin flush, i.e. without projections, to the body surfaces situated adjacent to the windowpane, for example to the A-, B- and C-columns of the passenger cabin. Since the guide channels for the flexible threaded cable are integrated into the lateral windowframe components, the window winder acts in this region upon the windowpane, with the result that the full height of the window shaft is available for accommodating the windowpane and the lower edge of the windowpane, when the window is closed, penetrates only slightly into the window shaft. As a consequence very low bodywork girdle heights can be achieved. If only one guide tube is connected to one windowframe component, then we have a single-track cable/tube window winder acting on one side. A two-track window winder, acting on both sides, can however be used. In this case a guide tube for one threaded cable each is connected to each of the two windowframe components.

The pane guide of this invention having the stated advantages can, of course, be used also on a rear door equipped with a sliding window.

In a further embodiment of the concept of this invention, the guide channels are formed circular in cross-section, possess a slit extending over their length for the passage of the carrier elements, and have a diameter corresponding to the internal diameter of the guide tube. The threaded cable can therefore move in the guide channels in the same manner as in the guide tubes, no projections occurring at the junction point between guide channel and guide tube which could interfere with displacements of the threaded cable.

Since windowframe components usually are made and assembled from sheet metal profiles, it is advantageous if the back-cut guide channels are integrally formed into the frame components formed from sheet metal profiles. The guide channels can thus be integrally formed during the manufacture of the windowframe components. It is, however, also possible to form the guide channels in separate profile bars which are connected with the windowframe components. These profiled bars can, for example, be cut from extruded plastics profiles, in which case an especially favourable, low-friction sliding pair with the steel thread of the threaded cable is obtained.

The profile bar advantageously possesses, adjacent to the integrally formed guide channel, a fixing strip which is screwed to the windowframe profile formed from a sheet metal profile.

The arrangement can, in the interests of facilitated assembly, also be such that the profiled bar possesses a substantially U-shaped cross-section, in the web zone of which the back-cut guide channel is formed, while the profile flanges possess at the outside projections, which are engaged behind associated projections of the windowframe component formed from a sheet metal profile. The profiled bars formed in this way, which preferably again are cut to length from a plastics extruded profile, can be snap-engaged in a simple manner like a clip without the use of tools into a corresponding seating opening of the windowframe component.

In pursuance of the concept of this invention, the guide channel is formed in or on a lateral wall or the external wall of the windowframe component. The inner wall of the windowframe component facing towards the interior of the vehicle does not, by contrast, in general need to be considered for the fitting of the guide channel, because this inner wall, when the pane guide is used on an automobile door, bears against a sealing profile fixed in the door opening.

To improve the guidance of the carrier elements on the windowframe components it is advantageous if these carrier elements are guided with projections against externally situated, mutually parallel side walls of the windowframe component additionally to the guiding of the slide elements in the guide channel.

For the secure fixing of the windowpane it is quite sufficient if one carrier element having one surface parallel to the windowpane is fixed by gluing to the windowpane at the lower and upper ends of each lateral edge. More than two carrier elements can, of course, be provided at intervals from each other spaced over the height of the window.

The carrier elements associated with the guide channel can also be rigidly connected together by a profile strip continuous over approximately the window height, which is fixed by gluing to the windowpane. This profile strip may likewise be arranged to slide on the windowframe component.

For the sealing of the windowpane to the windowframe, in a further embodiment of the concept of this invention, sealing profiles oriented towards the windowpane and projecting beyond the external surface of the windowframe are fixed to mutually facing side walls of the two lateral windowframe components, which (sealing profiles) are connected together by a corresponding sealing profile on the upper windowframe component.

When a profile strip extending over the window height and connecting the carrier elements together is fitted, the sealing arrangement will advantageously be such that the profile strip includes a sealing strip facing towards the sealing profile, which strip tapers upwardly and is oriented with its sealing surface transversely to the windowpane, that the sealing profile tapers correspondingly but in the reverse direction and bears against a flange of the windowframe component oriented transversely to the windowpane, and that the sealing surface of the sealing strip and the sealing profile, when the sliding window is closed, come to bear against each other with deformation and compression of the sealing strip onto the windowpane. By the arrangement of the explained tapering surfaces, the sealing surface of the sealing strip and the sealing profile move apart from each other just before commencement of the opening displacement of the windowpane, with the result that the sealing profile returns to its predetermined form and lifts off the windowpane. Consequently, during the greater part of the sliding movement of the windowpane, no friction takes place between windowpane and sealing profiles. During the shutting of the windowpane, by contrast, the described deformation of the sealing profile does not take place until the last phase of the closure movement, with the result that the sealing profile is pressed onto the windowpane only in this phase.

A more simple sealing arrangement, in which however the friction between the windowpane and the sealing profiles cannot be eliminated, is achieved if the sealing profiles fixed to the lateral windowframe components bear against the windowpane with prestress in all displaced positions of same. The sealing profiles here possess advantageously two sealing lips bearing against the windowpane, of which the one lip faces towards the carrier elements, while the other lip is oriented the opposite way. The first-mentioned lip here provides sealing against the outside, whereas the second mentioned lip faces towards the interior of the vehicle and presses, during travelling, against the windowpane as a consequence of the excess pressure building up in the passenger cabin when the windows are closed.

A further form of embodiment of a seal which automatically bears against the windowpane just before the closed position is reached consists in a movable sealing frame being disposed inside the windowframe, and carrying a sealing profile extending around its frame sides and oriented towards the windowpane and bearing against the latter in the closed position, and a flexible seal permanently bearing against a projecting strip of the windowframe components, inclined surfaces oriented downwards and towards the windowpane being formed on the two lateral parts of the movable sealing frame, with which (inclined surfaces) pressing elements fixed to the carrier elements, coming into bearing against the inclined surfaces just before the closed position is reached and sliding thereon until the closed position is reached, are associated. With this arrangement, the sealing frame is so to speak mounted floating relative to the windowframe, i.e. it can displace transversely to the windowpane. Its closure displacement is automatically brought about when the pressing elements which follow the pane movement run onto its inclined surfaces. When, by contrast, the windowpane is opened, the sealing frame automatically lifts with its sealing profile off the windowpane.

For achieving an automatic sealing when the closed position of the sliding window is reached, the windowpane can also be arranged displaceable relative to a sealing profile mounted stationarily on the windowframe. The arrangement here is advantageously such that the carrier elements are mounted displaceable on the slide elements transversely to the windowpane and engage into a guide slit disposed on the relevant, associated, lateral windowframe component, this guide slit extending over the travel distance of the associated carrier element, being oriented substantially parallel to the windowpane and following, at its upper end over a short travel distance, a course leading more closely to the inner wall of the windowframe component. The transverse movement of the windowpane is here brought about the guide slits associated with each of the carrier elements when the carrier elements enter or leave the aforementioned, short travel distance of the guide slits. A low-friction, easily manufactured slit guide is obtained if the guide slits are formed in a plastics strip which is laid in a lateral wall depression of the lateral windowframe components.

Where the pane guide of this invention is used on the sliding window of a forward door of an automobile, it may be advantageous if the forward, upper corner of the windowpane is held additionally in its closed position. In pursuance of the concept of this invention this is achieved in that, in the region of the forward, upper corner of the windowpane, a sliding block is slidably guided in the windowframe, which (slide block) penetrates into the guide channel with an entraining device, against which a restoring spring supported on the windowframe on the one hand bears and with which there is associated on the other hand the end of the one threaded cable of a two-track cable/tube window winder, that in an inclined surface of the sliding block facing towards the edge of the windowpane a back-cut block channel extending approximately diagonally in the inclined surface is disposed, into which (block channel) the sliding head of a pane holder engages relatively slidably, and in that the pane holder projects outwardly with a hook-shaped end through a guide opening formed stationarily in the windowframe in the vicinity of the edge of the windowpane. With this arrangement, the outer end of the threaded cable comes to bear against the entraining device of the sliding block just before the closed position of the windowpane is reached and displaces the sliding block against the force of the restoring spring, while as a consequence of the engagement between the pane holder and the sliding block the pane holder is pushed out of the guide opening and comes to bear, controlled by the guide opening, against the windowpane from the outside. When the windowpane is opened, the free end of the threaded cable moves away from the entraining device, so that the restoring spring can again push the sliding block forwards, the pane holder being again pulled back into the guide opening.

In pursuance of the concept of this invention, the guide tube of the window winder is connected by an arc-shaped connection piece of small radius of curvature to the lower end of the windowframe component. The absolute magnitude of the radius of curvature depends upon the flexibility of the threaded cable used, which is however very considerable in the case of the threaded cables used for window winder devices. Consequently, a relatively small radius of curvature can be achieved, with the result that the lower end of the windowframe component can be situated just above the base of the window shaft.

The upper windowframe component can have the same profiling as the lateral windowframe components, thus rendering the manufacture of the windowframe inexpensive. The guide channel and, optionally also the lateral wall depression for the plastics strip equipped with guide slits, are here closed by cover strips snap-engaged into the guide channel.

Further details of the invention are explained in greater detail below with reference to the examples of embodiment thereof in drawings in partly diagrammatic form.

Figure 2:
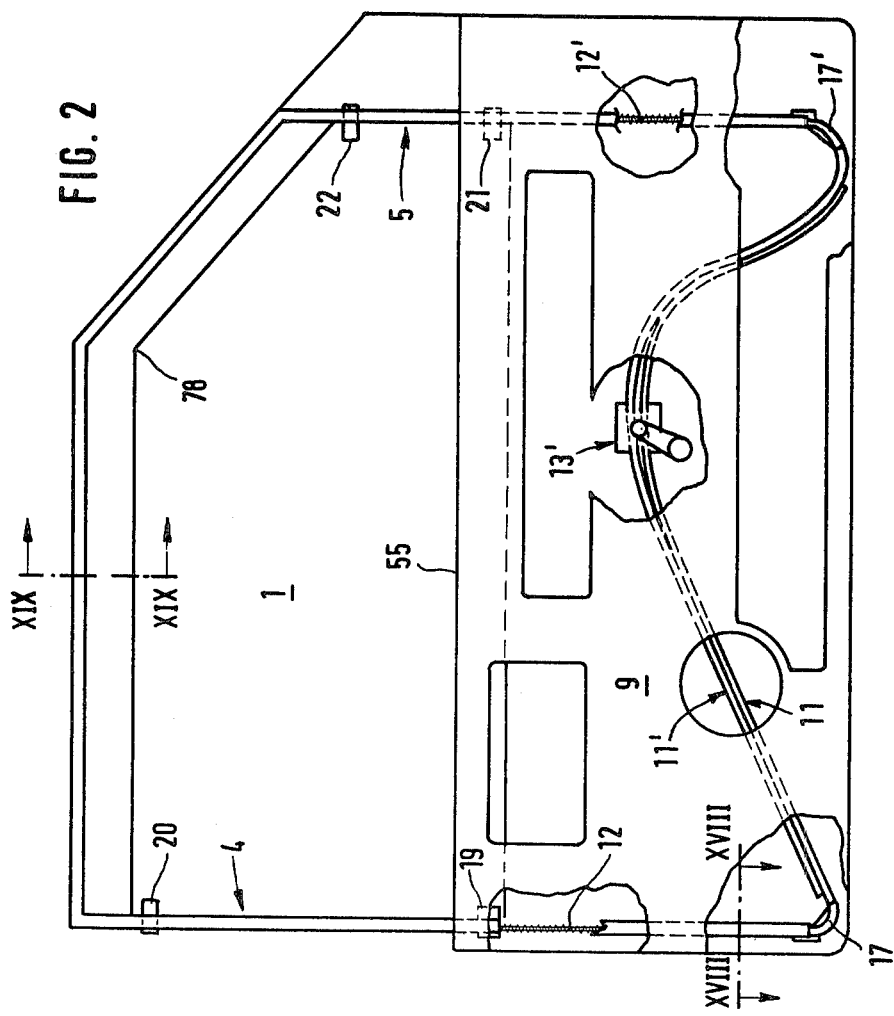
Figure 14:
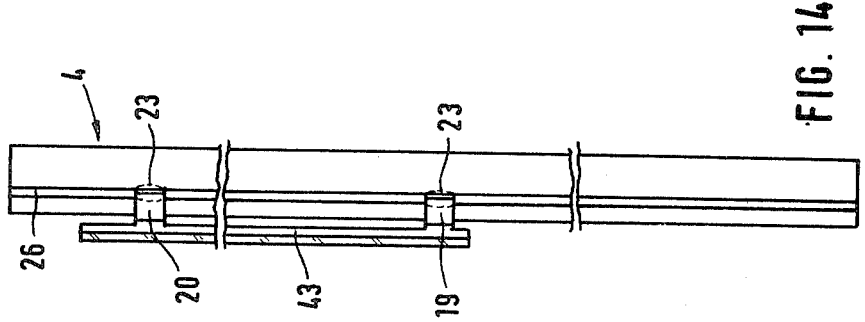
Figure 13:
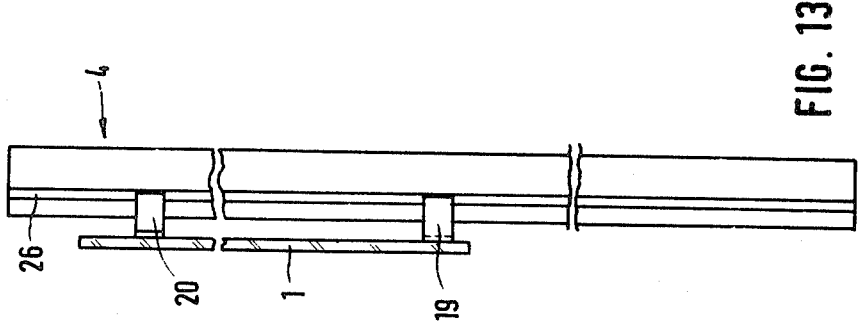
Figure 12:
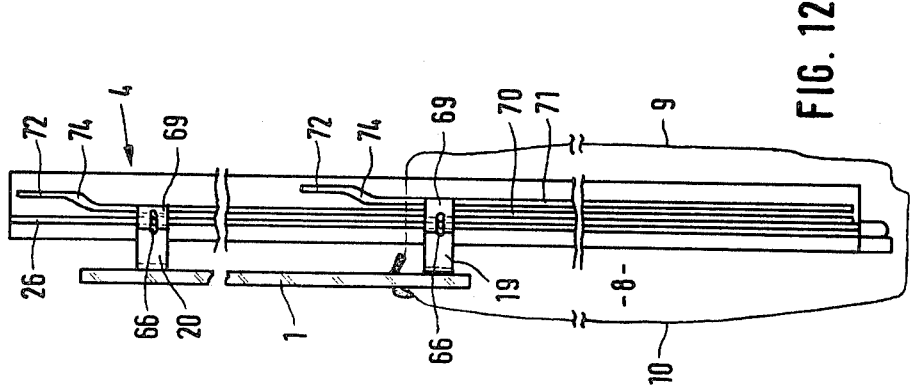
Figure 22:
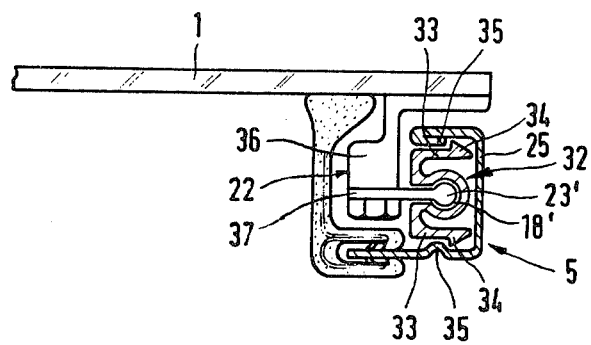
Figure 23:
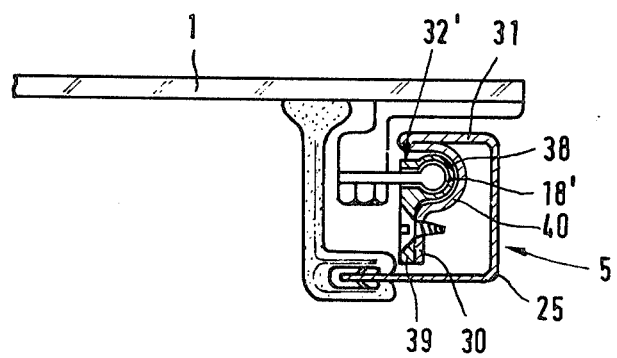
Figure 26:
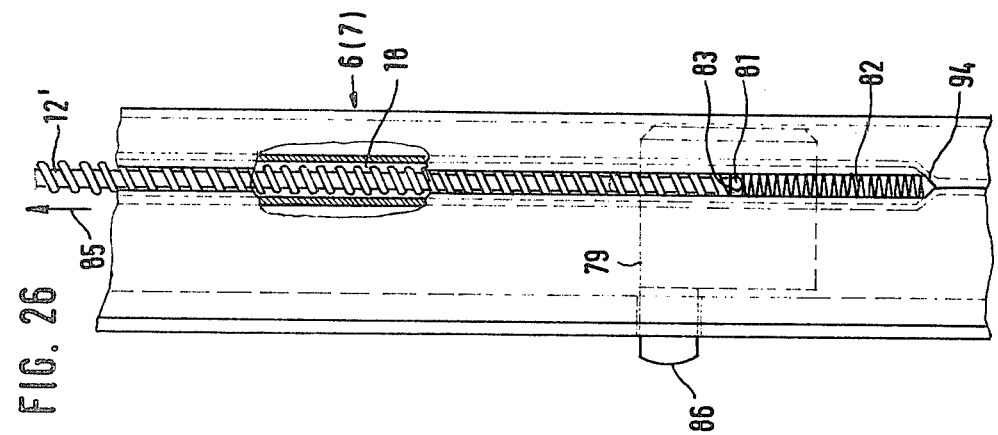
Figure 25:
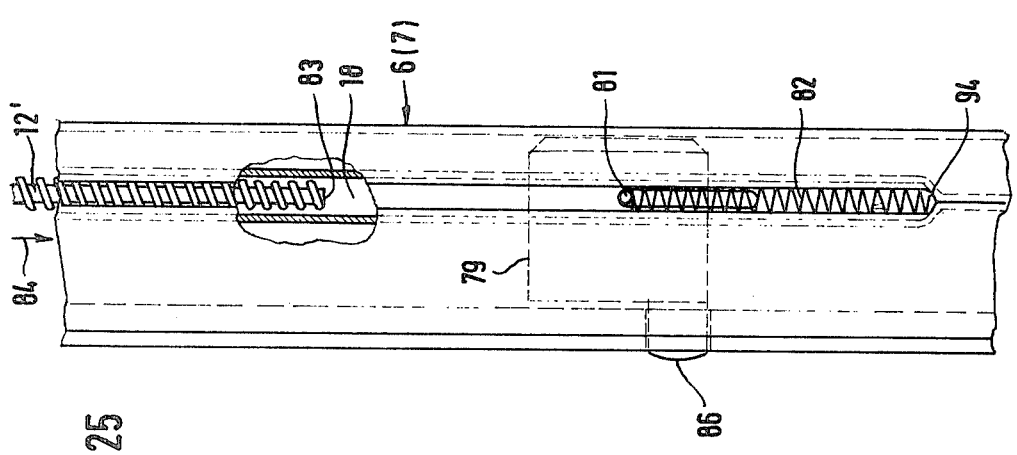
Figure 24:
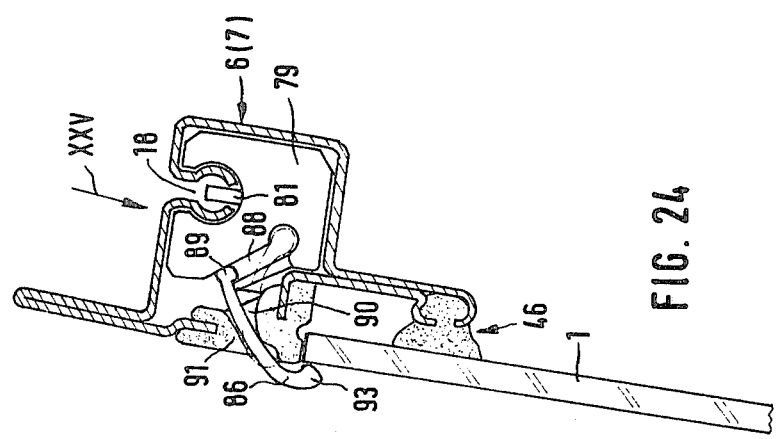
Figure 27:
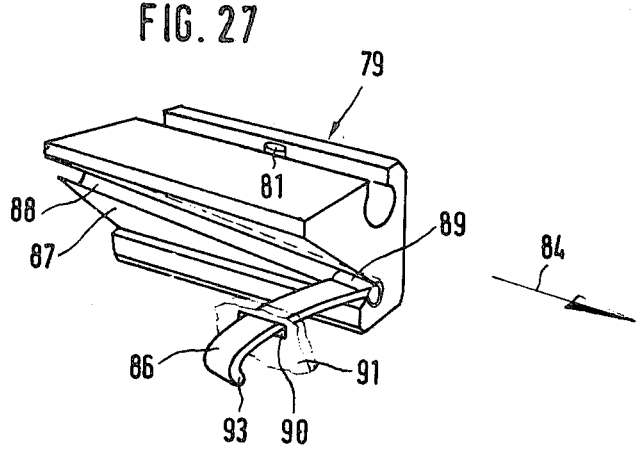

The drawings show:

FIG. 1 a partly cut away internal view of an automobile front door with single-track cable/tube window winder, FIG. 2 a door internal view similar to FIG. 1, but with two-track window winder, FIG. 3 a section along the cranked section line III—III in FIG. 1, FIG. 4 a section similar to FIG. 3 through a different form of embodiment, FIG. 5 a section similar to FIGS. 3 and 4 through a further form of embodiment, FIG. 6 a section similar to FIG. 3 through a form of embodiment with wedge-like seal, FIG. 7 a section corresponding to that of FIG. 3, but with the arrangement of a movable sealing frame, illustrated in the closed position of the window, FIG. 8 a section corresponding to FIG. 7, but with the position of the components in a window opening position, FIG. 9 a section along IX—IX in FIG. 7, FIG. 10 a section corresponding to the sectional line of FIG. 3, but with a transversely displaceable mounting of the windowpane, illustrated in the closed position of the windowpane, FIG. 11 a section corresponding to FIG. 10, but with the position of the components in the opening position of the windowpane, FIG. 12 an elevation of an automobile door in the direction of arrow XII in FIG. 11, FIG. 13 an elevation of the pane guide in the direction of arrow XIII in FIG. 3, FIG. 14 is an elevation of the pane guide in the direction of arrow XIV in FIG. 6, FIG. 15–FIG. 17 sections along line XV—XV in FIG. 6, but in different positions of the sealing components, corresponding to different displaced positions of the windowpane, FIG. 18 a section through the door shaft corresponding to line XVIII—XVIII in FIG. 2, FIGS. 19–21 similar sections along the line XIX—XIX in FIG. 2, but with different forms of the windowframe components and of the sealing situation, FIG. 22 a cut away section through a lateral windowframe component with engagement of the slide element into a profiled bar clipped onto the windowframe component, FIG. 23 a section similar to FIG. 22 with screw attachment of the profiled bar, FIG. 24 a section through the windowframe in the region of the forward, upper pane corner of a front door sliding window with additional corner holding, FIG. 25 part plan, partly cut away, on the subject of FIG. 24 in the direction of arrow XXV in FIG. 24, FIG. 26 a plan similar to FIG. 25, but with a different position of the components, FIG. 27 a perspective view of the sliding block according to FIGS. 24 to 26 and FIG. 28 a view similar to FIG. 27 but in a different relative position of the components illustrated.

The invention is illustrated in FIGS. 1 and 2 by the example of a front door of an automobile. The basic construction of the pane guide is described below with reference to FIGS. 1, 2 and 18.

The windowpane 1, illustrated in the vicinity of its upper closed position, is displaceably guided with its two lateral edges 2 and 3 in various ways to be explained below on the two lateral windowframe components 4 and 5. The upper closure of the windowframe is formed by the windowframe components 6 and 7, which are firmly connected with each other and with the lateral windowframe components 4 and 5 to form a one-piece windowframe. The lateral windowframe components 4 and 5 extend into the window shaft 8 (FIG. 18) and are each rigidly fixed by screws or by welding to the adjacent lateral wall of the door inner plate 9. Towards the outside, the window shaft 8 is bounded by the door outer plate 10.

The single-track window winder illustrated in FIG. 1 consists of the guide tube 11, placed in the window shaft 8, the flexible threaded cable 12 guided in tension-transmitting and pressure-transmitting manner therein and of the drive apparatus 13 with operating crank 14 fixed to the door inner plate. Inside the drive apparatus 13, a drive pinion (not illustrated) torsionally keyed to the operating crank 14 is provided, which engages into the thread turns of the threaded cable 12 and displaces the latter in the manner of a toothed rack in the guide tube 11 when the operating crank 14 rotates. The guide tube 11 is composed of a so-called active tube portion 15 and a passive tube portion 16, of which the former guides that portion of the cable which is in working use, while the latter houses the free portion of the cable projecting back from the drive apparatus 13. Window winders of the system described have long been known and therefore do not require any further explanation here.

The active tube portion 15 of the guide tube 11 is fixed by means of an arc-shaped connection piece 17 to the lower end of the windowframe component 4, the guide channel 18 disposed in the windowframe component 4 (FIG. 18) being aligned at the same diameter with the guide tube 11. The threaded cable 12 extends into the guide channel 18 and is firmly connected, in a manner not explained here, to a lower carrier element 19 fixed to the windowpane 1. In the examples according to FIGS. 1 and 2, four carrier elements 19 to 22 in total are fixed to the windowpane 1.

In the case of the two-track window winder according to FIG. 2, two guide tubes 11 and 11' are provided, in each of which a threaded cable 12, 12' respectively is slidably disposed. Accordingly, the drive pinion in the drive apparatus 13' engages into both the threaded cables 12 and 12', which are each firmly connected to the lower carrier elements 19, 21 respectively. In the windowframe component 5 also, a guide channel 18' is disposed (e.g. FIG. 3), in which the threaded cable 12' is slidably disposed. The connection of the frame component 5 to the guide tube 11' is provided by an arc-shaped connection piece 17'.

In the description below, in spite of different forms of embodiment, mutually corresponding parts are given the same reference numerals.

As can be seen from FIG. 3, in the back-cut guide channels 18, 18' slide elements 23, 23' respectively are slidably guided, which in the present example are formed as one piece with carrier elements 20, 22 cranked through three right angles. The lower carrier elements 19 and 21 not seen in FIG. 3 are of corresponding form, but their slide elements are firmly connected to the ends of the threaded cables 12, 12' respectively, for example by the threaded turns being removed from the cable core in the connection zone and the cable core being firmly connected at this point to the slide element by injection moulding around the joint or soldering or some other appropriate manner. In the case of the single-track window winder according to FIG. 1, only the slide element situated at the carrier element 19 is, of course, firmly connected with the threaded cable 12.

The back-cut guide channels 18, 18' are integrally formed into the outer lateral wall 25, 25' respectively of the windowframe components 4, 5 respectively formed as identical sheet metal profiles, having a substantially circular cross-section, and are outwardly open through a slit 26, 26' respectively extending over the length of the windowframe components 4, 5 for the passage of the carrier elements 19, 20 and 21, 22 respectively.

In FIGS. 3, 6 and 11, the B-column 27 of the automobile body adjacent to the windowframe component 4 is shown in dot-and-dash line. As can be seen from these figures, the outer surface 28 of the B-column 27 lies flush with the outer surface of the windowpane 1, so that no projecting edges, increasing the wind resistance, are formed. In the windowframe components 4 to 7 also, no projecting edges are formed, because the windowframe as a whole lies internally and is covered externally by the windowpane 1. Between the windowframe and the B-column 27, there is a seal 29 fixed to the B-column.

In the examples of embodiment corresponding to FIGS. 3, 6 to 8, 10, 11 and 18, the guide channels 18, 18' are, as already explained with reference to FIG. 3, integrally formed into the outer side wall 25, 25' respectively of the windowframe components 4, 5 respectively moulded from sheet metal. In the example of embodiment corresponding to FIGS. 7 and 8, by contrast, the backcut channels 18, 18' are each in the inner side wall 30, 30' respectively of the windowframe components 4, 5, respectively. Here, the carrier elements, of which only the two upper carrier elements 20 and 22 can be seen in the drawing, are cranked only twice through a right angle. A corresponding arrangement is provided in the example of embodiment according to FIG. 4. In the example of embodiment corresponding to FIG. 5, by contrast, the guide channels 18, 18' are integrally formed in the outer walls 31, 31' respectively of the windowframe components 4, 5 respectively. Here the carrier elements 20 and 22 and, of course also, the carrier elements 19 and 21 not seen in FIG. 5, are cranked only once through a right angle or possess a T-shaped cross-section, on the free web component of which the slide elements 23, 23' are integrally formed.

As FIGS. 22 and 23 make clear, the back-cut guide channels 18, 18' do not, however, need to be integrally formed directly into the windowframe components moulded from sheet metal. In the example according to FIG. 22, a profiled bar 32 of substantially U-section, which preferably is extruded from a plastics material, is used, in the web zone of which the back-cut guide channel 18' is integrally formed. The profile flanges 33 possess outwardly oriented projection 34, which are snap-engaged like clips behind associated projections 35 of the L-section windowframe component 5 formed from sheet metal. The carrier elements, of which here only the carrier element 22 is shown, each consist of a moulding 36 glued to the inner face of the windowpane 1 and of a flat portion 37, possessing at its outer end the slide element 23', and screwed to the moulding 36. After the snap engagement of the thus formed windowframe components with the profiled bar 32, these constitute one unit.

A modified form of embodiment is shown in FIG. 23, in which a profiled bar 32' is provided which, adjacent to the guide channel 18' integrally formed in a thickened zone 38, possesses a fixing strip 39 preferably extruded from a plastics material as one piece with the thickened zone 38, which fixing strip is screwed to the windowframe component 5 formed from sheet metal. The windowframe component 5 possesses an integrally formed depression 40 for form-fittingly seating the thickened zone 38 of the profiled bar 32'. After screwing together, the windowframe component 5 and profiled bar 32' here again form one unit. The profiled bar 32', 32 respectively does not have to be disposed on the inner lateral wall 30 or inner side of the windowframe component 5. Arrangements on the outer lateral wall 25 or on the outer side or even on the external wall 31 may be considered, if windowframe components profiled from sheet metal are correspondingly formed.

In the examples shown in FIGS. 3, 6, 10 and 11, the carrier elements possess, as shown in the example of the carrier elements 20 and 22, mutually facing projections 41 and 42, by which the carrier element are guided on mutually parallel wall zones of the outer lateral walls 25, 25' and the inner lateral walls 30, 30' in addition to the guidance of the slide elements in the guide channels.

As shown in FIGS. 1 and 2 in conjunction with the sectional views according to FIGS. 3 to 8, 10 and 11, the carrier elements 19 to 22 each possess a surface facing towards the windowpane 1 and thus plane-parallel thereto, by which they are fixed by gluing to the upper and lower ends of each lateral edge 2, 3. The carrier elements 19, 20 and 21, 22 at each lateral edge of a pane can, as shown in the aforementioned figures, be individually constructed and individually fixed. The carrier elements can, however, also be rigidly connected together in pairs by a profiled strip 43 continuous over approximately the height of the window, for example may be integrally formed with this strip, as is apparent from the example according to FIG. 6. In this case, the profiled strip 43 is glued at its surface facing towards the windowpane 1 and therefore plane-parallel thereto, to the internal surface of the windowpane.

The sealing between the windowpane 1 and the profile frame 4 to 7 can be constructed in various ways. A fundamental of all the examples of embodiment is that the sealing is disposed inside the windowframe, i.e. it follows the mutually facing lateral walls of the lateral windowframe components 4, 5 and continues correspondingly also along the upper windowframe components 6 and 7. Forms of seal are possible which bear permanently against the inner face of the windowpane 1, and also those forms which are pressed onto the pane only just before the window closed position is reached.

A very simple seal is now described with reference to FIGS. 3 to 5 and the associated FIG. 21. The windowframe components 4 to 7 constituting the windowframe here possess, at the inner lateral walls 30, 30', 30'', flange projections 44 formed doubled from the sheet metal of the windowframe components, onto which flange projections a holding profile 45, approximately horseshoe shaped, is pushed, which carries on its surface facing towards the windowpane 1 a sealing profile 46. In the unpressed state, i.e. without a windowpane, the sealing profile 46 adopts the form indicated in broken line in FIG. 3. It can therefore be seen that this profile 46, in the pressed state, i.e. when the windowpane 1 is fitted, bears with prestress against the inner face of the windowpane. The sealing profile 46 possesses two sealing lips 47 and 48, bearing against the windowpane 1, of which the sealing lip 47 provides the sealing against the outside, so that no water can penetrate from outside through the gap between windowpane 1 and windowframe 4 to 7. The sealing lip 48 is situated on the inner side of the windowframe and bears, due to its flexibility, firmly and sealingly onto the windowpane under the influence of the excess air pressure present in the passenger cabin when the vehicle is travelling. The so far described simple seal bears permanently against the closed or partly opened windowpane, so that during the closing and opening of the windowpane the friction between the sealing lips 47, 48 and the windowpane 1 always has to be overcome.

A first form of embodiment of an automatically pressing-on seal is described below with reference to FIGS. 6 and 15 to 17. As can be seen from FIG. 6, at each of the two profile strips 43 one sealing strip 49 is provided, the sealing surface 50 of which faces towards the sealing profile 46. The sealing profile 46 is clamped between two flanges 51 and 52 bent over from the sheet metal of the windowframe component, of which the flange 51 extends parallel to the windowpane 1, whereas the flange 52 is oriented transversely to the windowpane. Correspondingly, at the upper windowframe components 6, 7, as shown by the example of FIG. 19, a sealing profile 46 following the lateral sealing profiles is fixed.

The sealing surface 50 is sloped or tapered, so that the sealing strip 49 tapers in the manner of a wedge upwards, as can be seen particularly in FIGS. 15 to 17. The sealing profile 46 possesses a sealing bending facing towards the windowpane 1 and the sealing surface 50, which beading is tapered or sloped corresponding to the sealing strip 49 but in the opposite direction, as can also be seen from FIGS. 15 to 17. When the windowpane 1 is completely lowered into the windowshaft, as is the case with the position of the parts as in FIG. 15, the sealing strip 49 and sealing beading of the sealing profile 46 do not touch each other. Over a wide range of the closure movement of the windowpane 1 also, there is no contact between these two components, as illustrated in FIG. 16 for the half-closed windowpane. So long as the sealing surface 50 and the sealing beading 53 are not in contact, the sealing beading 53 is not deformed and therefore also does not bear against the windowpane 1, with the consequence that this pane can be moved without friction against the seal. In the position of the components shown in FIG. 6 also, the sealing beading 53 does not yet bear against the inner face of the windowpane 1, because the sliding window is not yet fully closed. Not until the last phase of the closure movement, does the sealing surface 50 run onto the sealing beading 53, with the result that as the closure movement continues the sealing beading 53 is so deformed that it presses sealingly against the windowpane 1. It then bears against the flange 52. The closed position is shown in FIG. 17. Vice versa, in the opening displacement, the pressing deformation of the sealing beading 53 rapidly disappears, so that even after only a short opening displacement the friction between windowpane 1 and seal 46 is removed.

A second form of embodiment of an automatically pressing-on seal is described below with reference to FIGS. 7 to 9. Here, a movable sealing frame 54 is disposed inside the windowframe 4 to 7, the sealing frame having a substantially U-section open towards the windowpane 1. The frame can be constructed closed, i.e. surround the window opening not only at the sides but also at top and bottom, its lower part (not illustrated) then with advantage lying between the upper edge 55 (FIG. 2) of the door plates 9, 10. Onto its inner profile flange 56 a holding profile 45 is pushed, on which the sealing profile 46, formed as a lip seal, is fixed. The form of the lip seal corresponds to that which was described with reference to FIGS. 3 to 5 and 21. The seal 46 is adjoined, at the lateral parts and upper parts of the windowframe, by a flexible hollow chamber seal 57, which is fixed to a further clamping or holding profile 58, which is pushed in clamping manner onto a double strip 59, projecting from the windowframe horizontally in the direction of the windowpane 1 and formed from the sheet metal of the windowframe. In this manner the sealing frame 54 is held on the windowframe movably approximately perpendicularly to the windowpane 1.

On the outer profile flange 60 of each of the two lateral frame components of the sealing frame 54, a guide plate 61 is fixed at the top, this guide plate being cut away in such a manner that an inclined surface 62, oriented downwards and towards the windowpane 1, is produced. The inclined surface 62 co-operates with a pressing element, formed in the example shown as a pin 63, which is fixed to the carrier element 20, 22 respectively. At the lower end of the two lateral components of the movable sealing frame 54, corresponding guide plates 61 can be disposed, the inclined surfaces 62 of which co-operate with pins 63 correspondingly fixed to the carrier elements 19 and 21. If, however, the sealing frame 54 does not possess any lower frame strip connecting the two lateral frame strips together, then the arrangement can be of the type shown in the lower half of FIG. 9. Here the profile flange 60 is so cut away that a downwardly open recess is produced, constituting the inclined surface 62. In this case, the pin 63 forming the pressing element is fixed to an extension 64 of the carrier element 19, 21 respectively. So long as the inclined surfaces 62 are not in engagement with the pins 63, which is the case over almost the entire window movement, the sealing frame 54 is situated in its retracted position illustrated in FIG. 8, in which the sealing profile 46 is lifted off the windowpane 1. In the last phase of the closure movement, the pins 63, which follow the movement of the windowpane, come to bear against the inclined surfaces 62 with the result that the sealing frame 54 is displaced towards the windowpane 1, until, in the closed position of the windowpane 1, it finally adopts the position shown in FIG. 7, in which the sealing profile 46 bears sealingly against the windowpane. When the windowpane is opened, the pins 63 displace on the associated inclined surfaces 62, with the result that the sealing frame 54, due to the restoring force of the elastic hollow chamber seal 57, displaces in the opposite direction away from the windowpane 1 until the sealing profile 46 once again adopts the position lifted off the pane illustrated in FIG. 8. A forced retraction of the sealing frame 54 at the commencement of the opening displacement of the windowpane 1 can be achieved if corresponding inclined surfaces 65 are formed in the guide plates 61 or in the profile flange 60 opposite to the inclined surfaces 62. Such an inclined surface 65 is indicated in dot-and-dash line in the upper part of FIG. 9. During the downward movement of the pin 63, this pin comes to bear against the inclined surface 65 and displaces the sealing frame 54 towards the left, as viewed in FIG. 9.

A third form of embodiment of an automatically pressing-on seal is described below with reference to FIGS. 10 to 12. In contrast to the hitherto stated self-sealing forms of embodiment, the windowpane here is displaced relative to a seal fixed stationarily on the windowframe. For this purpose the carrier elements 19 to 22 are each equipped with an elongated hole 66 oriented perpendicular to the windowpane 1, as indicated in respect of the carrier elements 19 and 20 in FIGS. 10 to 12. Into these elongated holes 66 the slide elements 23, 23' engage relatively displaceably with pins 67. Heads 68 on the pins 67 secure the position of the pins 67 in the elongated holes 66.

The carrier elements 19 to 22 possess hook-shaped extensions 69, which engage into guide slits 70 and 71 parallel to each other in the lateral windowframe components 4 and 5. The position of these guide slits 70 and 71 is illustrated with reference to the windowframe component 4 in FIG. 12. The hook-shaped extensions 69 of the carrier elements 20 and 22 penetrate into the slits 70, whereas the hook-shaped extensions 69 of the carrier elements 19 and 21 penetrate into the slits 71. At the upper ends of each of the slits 70 and 71, a short slit length 72 is provided, which lies more closely to the inner wall 73 (FIGS. 10, 11) than the principal regions of the guide slits 70 and 71. The short slit lengths 72 are connected with the associated guide slits 70 and 71 by transitions 74, which are so dimensioned that they permit the hook-shaped extensions 69 to move over from the slits 70, 71 respectively into the short slit lengths 72.

The guide slits 70 to 72 are integrally formed, in the example shown, into a plastics strip 75, which is formfittingly fixed in a corresponding depression 76 in the outer lateral wall 25, 25'. The flange projection 44, extending from the inner lateral wall 30, 30' of the windowframe components 4 to 7, in turn carries the sealing profile 46.

If the windowpane 1 is moved from an open position, as shown for example in FIGS. 11 and 12, into the closed position, then the hook-shaped extensions 69 of the carrier elements 19 to 22 initially move in the zones of the guide rails 70 and 71 parallel to the windowpane. The windowpane 1 still moves without transverse displacement, the frictional contact with the sealing profile 46 being entirely or at least substantially neutralized. As soon, however, as the hook-shaped extensions 69 run into the transitions 74, the windowpane displaces, additionally to its upward movement, towards the windowframe 4 to 7. The windowpane is here pressed increasingly onto the sealing profile 46, the latter being deformed as can be seen from FIG. 10. Simultaneously the carrier elements 19 to 22 move relative to the slide elements 23, 23'. After the hook-shaped extensions 69 have run into the short slit lengths 72, the components have the relative position shown in FIG. 10, which is retained until the closed position. During the opening operation, a displacement of the windowpane 1 guided through the short slit lengths 72 takes place in reverse manner with friction of same against the sealing profile 46, until the hook-shaped extensions 69 once again run into the transitions 74 and finally into the long slits 70 and 71.

FIGS. 19 to 21 illustrate that the upper windowframe components also have a cross-section corresponding to the two associated lateral windowframe components depending upon the form of embodiment. From these figures it can also be seen that in the region of the upper windowframe components, the guide channels 18 not required there, and in the case of FIG. 20 the depression 76 also, are closed by cover strips 77 snap engaged into the guide channels 18.

Although the windowpanes 1 are illustrated in the drawings as flat panels, as apparent particularly from FIGS. 12 to 14, with the result that the windowframe components 4 and 5 are also constructed correspondingly straight, the windowpanes 1, the windowframe components 4 and 5 and, also of course, the guide channels 26 can be formed curved according to the actual profiling of the vehicle body. The slide elements 23, 23' can possess a bulging or rounded cylindrical surface, as shown in FIG. 14.

For very long windowpanes 1 and/or short guide length in the region of the forward windowframe component 5, i.e. in conditions such as frequently occur in front doors, measures for the additional holding of the windowpane 1 in the region of the forward, upper corner 78 (FIGS. 1, 2) may be adopted. For explaining these measures, reference is now made to FIGS. 24 to 28.

In the windowframe component 6 or 7, a sliding block 79 is displaceably guided on inner walls of the windowframe component. An entraining device 81, penetrating through an elongated hole 80 in the wall of the guide channel 18 into the guide channel is fixed to the sliding block 79. The elongated hole 80 limits with its front and rear ends the possible sliding movement of the sliding block. Against the entraining pin 81 there bears from one side the end of a restoring spring 82, formed as a helical compression spring, which bears at its other end against a constriction 94 of the guide channel 18. The free end 83 of the threaded cable 12' 12' of a two-track window winder is, in open positions of the sliding window, not in contact with the entraining pin 81 and adopts, for instance, the position illustrated in FIG. 25. In the last phase of the closure displacement, however, the free end 83 runs up against the entraining device 81 and displaces the latter and thus also the sliding block 79 against the force of the restoring spring 82. The final position of this displacement movement, in which the entraining device 81 has reached the end of the elongated hole 80, is shown in FIG. 26. The direction of the arrow 84 in FIG. 25 denotes the direction of movement of the threaded cable 12' during closure movements of the windowpane. The direction of arrow 85 in FIG. 26 denotes the direction of opening displacement. If the windowpane 1, starting from the closed position, is opened, then the threaded cable 12' moves in the direction of arrow 85, the restoring spring 82 still holding the entraining pin 81 in contact with the free end 83 of the threaded cable 12' during a first movement phase, until the entraining pin 81 strikes the other end of the elongated hole 80. Here the displacement of the sliding block 79 ends, so that during continued opening movement of the windowpane 1, the free end 83 of the threaded cable 12' moves away from the entraining pin 81. The described displacement of the sliding block 79 in the one or other direction is used for controlling the movement of a pane holder 86, which is explained in more detail below with particular reference to FIGS. 24, 27 and 28.

The sliding block 79 possesses a plane inclined surface 87 facing towards the edge of the windowpane, in which surface a diagonally oriented, back-cut block channel 88 is formed. In this block channel 88, which has a substantially circular cross-section, a substantially cylindrical sliding head 89 of the pane holder 76 is disposed slidable and simultaneously pivotal about the axis of the sliding head. The pane holder 66 is guided outwardly through a guide opening 90, situated in a guide piece 91 mounted stationarily on the windowframe component 6, 7 respectively.

Figure 28:
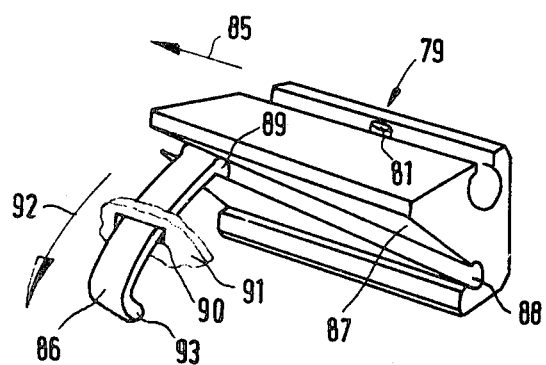

When the pane holder 86 adopts the position shown in FIGS. 24, 26 and 28, it is pushed out to the maximum extent from the guide piece 91 in the direction of arrow 92 in FIG. 28, and comes to bear with its end 93 against the external surface of the windowpane 1 in the region of the upper pane edge, as shown in FIG. 24. In this way the windowpane 1 is pressed in its forward, upper region also firmly against the sealing profile 46. During opening displacement of the windowpane 1 the sliding block 79 moves in the direction of arrow 85, the sliding head 89 travelling a sliding distance, accompanied by simultaneous pivoting, inside the block channel 88 from its position as shown in FIG. 28 to its position shown in FIG. 27. Due to the diagonal orientation of the block channel 88 in the inclined surface 87, the pane holder 60 is retracted, guided by the guide opening 90, into the guide piece 91, until it adopts the position shown in FIG. 27. This position is shown in FIG. 24 in dot-and-dash lines. As can be seen, during the retracting of the pane holder 86, the windowpane 1 becomes released from the hook-shaped end 93 of the pane holder 86.

We claim:

1. In a pane guide for a sliding window capable of being lowered into the window shaft of an automobile, the windowpane of which is slidably guided at both lateral edges on lateral windowframe components extending into the window shaft and is connected with the actuating element of a window winder which is formed as flexible threaded cable guided in tension-resistant and pressure-resistant manner displaceably in a guide tube, which cable engages with the drive pinion of a stationary mounted drive apparatus, the improvement comprising: a back-cut guide channel (18, 18') of circular cross-section at each window frame component (4, 5), each said guide channel extending in the longitudinal direction of its respective window frame component and having a slit (26, 26') extending over its entire length, slide elements (23, 23') displaceably guided in said guide channels and connected with carrier elements (19, 22) fixed to the inner surface of the windowpane (1), said slits (26, 26') permitting movement of said carrier elements (19, 22) with said slide elements (23, 23'), a guide tube (11, 11') aligned with and connected to the lower end of at least one of the windowframe components (4, 5), said guide channels (18, 18') having a diameter corresponding to the internal diameter of said guide tube (11, 11'), and a threaded cable (12, 12') extending into the guide channel (18, 18'), at said one window frame component (4, 5) and fixed to at least one of the slide elements (23, 23') situated therein.

2. Pane guide according to claim 1, characterized in that the back-cut guide channels (18, 18') are integrally formed into the windowframe components (4, 5) formed of metal sheet profiles.

3. Pane guide according to claim 1, characterized in that the guide channels (18, 18') are integrally formed into separate profile bars (32, 32'), which are connected with the windowframe components (4, 5).

4. Pane guide according to claim 3, characterized in that the profile bar (32') possesses, adjacent to the integrally formed guide channel (18'), a fixing strip (39), which is screwed to the windowframe component (4, 5) formed from a sheet metal profile.

5. Pane guide according to claim 4, characterized in that the profile bar (32) has a substantially U-shaped cross-section, in the web region of which the back-cut guide channel (18') is integrally formed, whereas the profile flanges (33) possess externally projections (34) which are engaged behind associated projections (35) of the windowframe component (4, 5) formed from a sheet metal profile.

6. Pane guide according to claim 1, characterized in that the guide channel (18, 18') is mounted in or on a lateral wall (25, 25'; 30, 30') or the external wall (31, 31') of the windowframe component (4, 5).

7. Pane guide according to claim 1, characterized in that the carrier elements (19 to 22) are additionally slidably guided by projections (41, 42) at external, mutually parallel lateral walls (25, 25'; 30, 30') of the windowframe component (4, 5).

8. Pane guide according to claim 1, characterized in that one carrier element (19, 20 and 21, 22) having a surface parallel to the windowpane is attached by gluing to the windowpane (1) at the lower and upper ends of each lateral edge.

9. Pane guide according to claim 1, characterized in that the carrier elements (19, 20 and 21, 22) associated with each guide channel (18, 18') are rigidly connected together by a profile strip (43) continuous over approximately the window height, which is fixed by gluing to the windowpane (1).

10. Pane guide according to claim 1, characterized in that, at mutually facing side walls (30, 30') of the two lateral windowframe components (4, 5), sealing profiles (46) oriented towards the windowpane (1) and projecting beyond the external surface of the windowframe are fixed, which profiles are connected together by a corresponding sealing profile (46) on the upper windowframe component (6,7).

11. Pane guide according to claim 1, characterized in that the profile strip (43) includes a sealing strip (49) oriented towards the sealing profile (46), which (sealing strip 49) tapers in wedge-form upwardly and is oriented with its sealing surface (50) transversely to the windowpane (1), that the sealing profile (46) is, however, correspondingly tapered in the opposite direction and bears against a flange (52) of the windowframe component (4, 5) oriented transversely to the windowpane and that the sealing surface of the sealing strip and the sealing profile, when the sliding window is closed, bear against each other with deformation and pressing of the sealing profile onto the windowpane.

12. Pane guide according to claim 10, characterized in that the sealing profiles (46) fixed to the lateral windowframe components (4, 5) bear with prestress against the windowpane (1) in all displaced positions of same.

13. Pane guide according to claim 12, characterized in that the sealing profiles (46) possess two sealing lips (47, 48) bearing against the windowpane (1), of which the one lip (47) faces towards the carrier elements (19 to 22), while the other lip (48) is oriented in the opposite direction.

14. Pane guide according to claim 1, characterized in that, within the windowframe, a movable sealing frame (54) is disposed, which carries, extending around its frame sides, a sealing profile (46) oriented towards the windowpane (1) and bearing against it in the closed position, and a flexible seal (57) bearing permanently against a projecting strip (59) of the windowframe components (4 to 7), downwardly inclined surfaces (62) oriented towards the windowpane being formed on the two lateral components of the movable sealing frame, with which (inclined surfaces) there are associated pressing elements (63), fixed to the carrier elements (19 to 22), coming into bearing against the inclined surfaces just before the closed position is reached and sliding thereon until the closed position is reached.

15. Pane guide according to claim 1, characterized in that the carrier elements (19 to 22) are mounted on the slide elements (23, 23') displaceably transversely to the windowpane (1) and engage into a guide slit (70, 71) disposed on the associated lateral windowframe component (4,5), which (guide slit) is continuous over the travel distance of the associated carrier element (20, 22 and 19, 21 respectively), extends substantially parallel to the windowpane and, at its upper end for a short distance of travel (72), follows a course approaching more closely to the inner wall (73) of the windowframe component (4,5).

16. Pane guide according to claim 15, characterized in that the guide slits (70, 71, 72) are integrally formed into a plastics strip (75), which is inserted into a lateral wall depression (76) of the lateral windowframe components (4,5).

17. Pane guide according to claim 1, for the front door of an automobile, characterized in that, in the region of the upper, forward corner (78) of the windowpane (1), a sliding block (79) is displaceably guided in the windowframe (6 or 7), which (sliding block) penetrates into the guide channel (18) with an entraining device (81), against which on the one hand there bears a restoring spring (82) supported in the windowframe and with which on the other hand there is associated the end (83) of the one threaded cable (12') of a two-track cable/tube window winder, that in an inclined surface (87) of the sliding block (79) facing towards the edge of the windowpane a back-cut block channel (88) extending approximately diagonally in the inclined surface is disposed, into which (block channel) the sliding head (89) of a pane holder (86) engages with relative displacement, and that the pane holder (86) projects outwardly with a hook-line end (93) through a guide opening (90) formed stationarily in the windowframe (6 or 7) in the vicinity of the windowpane edge.

18. Pane guide according to claim 1, characterized in that the guide tube (11, 11') of the window winder is connected via an arc-shaped connecting piece (17, 17') of small radius of curvature to the lower end of the windowframe component (4, 5).

19. Pane guide according to claim 1, characterized in that the upper windowframe component (6, 7) has the same profiling as the lateral windowframe components (4, 5), the guide channel (18, 18') and possibly also the lateral wall depression (76) being closed by cover strips (77) snap-engaged into the guide channel.

* * * * *